United States Patent [19]

Dolenti

[11] 4,326,316
[45] Apr. 27, 1982

[54] HOT STICK ROTARY BRUSH FOR CLEANING AERIAL CONDUCTORS

[76] Inventor: Alfred N. Dolenti, 192 Limerick Center Rd., Royersford, Pa. 19468

[21] Appl. No.: 194,387

[22] Filed: Oct. 6, 1980

[51] Int. Cl.³ .............................................. A46B 13/02
[52] U.S. Cl. ......................................... 15/246; 15/23; 15/88
[58] Field of Search .................... 15/23, 24, 88, 97 R, 15/104.04, 256.5, 246, 256.6; 51/170 PT; 118/72, 208, DIG. 11, DIG. 21; 134/6, 9

[56] References Cited

U.S. PATENT DOCUMENTS 2,962,739 12/1960 Schoch ..................................... 15/23
3,187,361 6/1965 Wheeler .................................. 15/88

FOREIGN PATENT DOCUMENTS 802943 2/1951 Fed. Rep. of Germany .......... 15/23

OTHER PUBLICATIONS

Powered Air Scrubber–U.S. Industrial Tool and Supply Company Publication.

*Primary Examiner*—Edward L. Roberts
*Attorney, Agent, or Firm*—Paul & Paul

[57] ABSTRACT

A device for cleaning the surface of aerial conductors comprises a rotary brush having a circumferential groove, a fluid-powered motor for driving the brush rotationally, and a J-hook hanger guide one end of which is secured to the power drive housing and the other end of which is adapted to be hooked over the cable. The hanger guide is so shaped and aligned relative to the rotary brush that when the hanger guide is hooked over and supported on the conductor, the conductor is engaged by the brush bristles within the circumferential groove of the rotary brush. The assembly device is mounted at one end of a hot stick which is manipulated by a single lineman to slide the power-driven brush along the conductor in a first direction to clean one-half of the peripheral surface of the conductor. Then the device is turned through 180° and slid along the conductor in the opposite direction to clean the other half of the peripheral surface.

9 Claims, 5 Drawing Figures

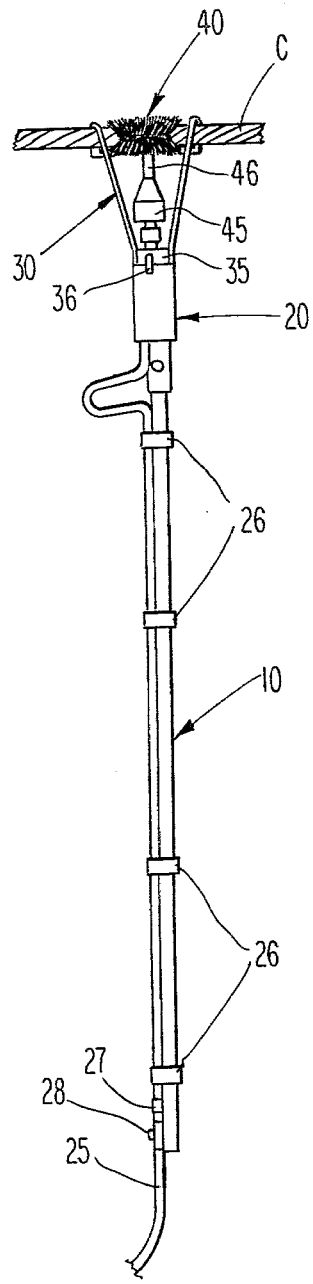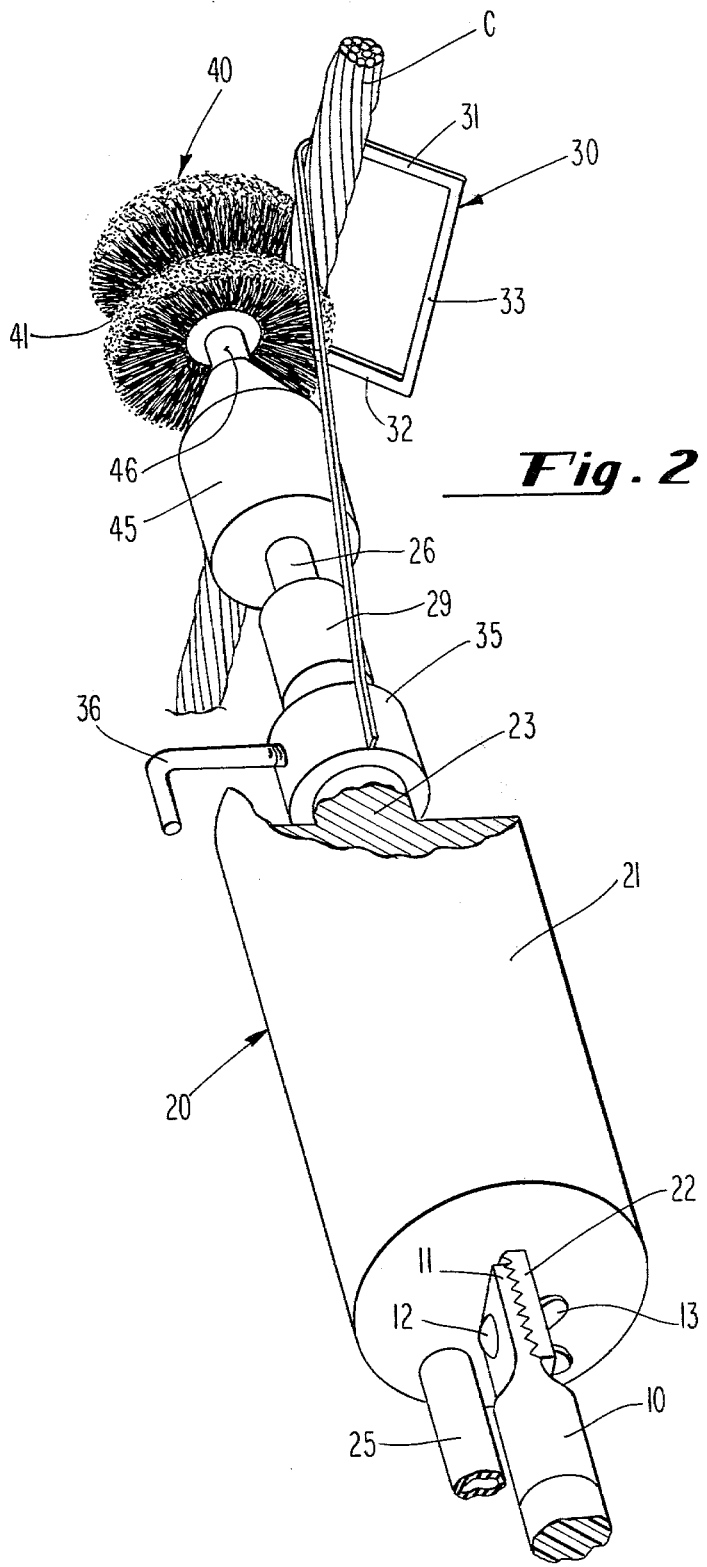

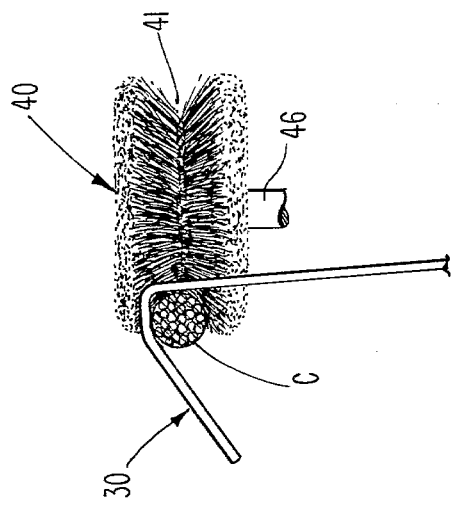
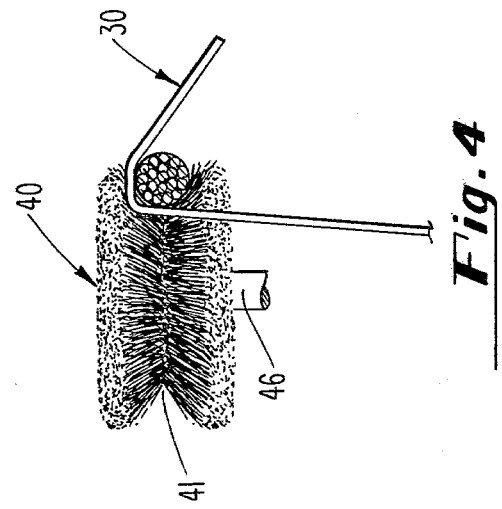
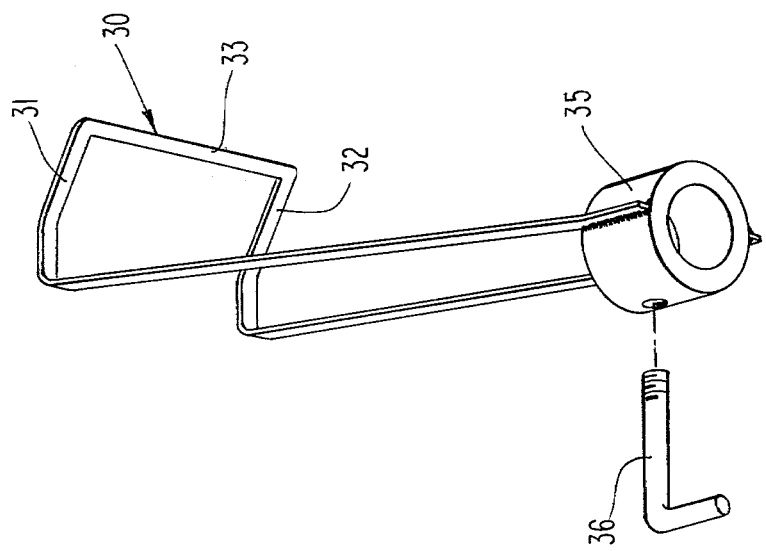

HOT STICK ROTARY BRUSH FOR CLEANING AERIAL CONDUCTORS

BACKGROUND OF THE INVENTION

This invention relates to an air-powered, or hydraulically-powered, rotary brush for cleaning aerial conductors, the brush being mounted on a hot stick.

In splicing aerial conductors, it is essential that the surfaces of the conductors be thoroughly cleaned. In doing this work live, that is, to splice together aerial conductors which are carrying high voltage, it was heretofore customary to use a wire brush operated by an air-powered drive tool mounted on a hot stick. The prior art brush was a roller brush which rotated on its longitudinal axis and was held in a perpendicular position transverse to the conductor. The air-powered drive tool was operated by a first lineman who manipulated the hot stick while the flexible insulating air-supply hose was controlled and guided by a second lineman. The roller brush was always held at right angles transverse to the conductor and was moved from side to side in many sweeps along the conductor at various angles and various positions around the conductor in order to achieve a complete and satisfactory cleaning. The work described was tedious, and was a time-consuming task for two men.

SUMMARY OF THE INVENTION

A principal object of the present invention is to provide an improved powered rotary brush which may be mounted on a hot stick and operated by a single lineman, instead of by two men as in the prior art, to effect cleaning of an aerial conductor.

Another object is to provide an improved powered rotary brush which may be manipulated by a single lineman to clean the peripheral surface of an aerial cable in but two passes along the cable.

The present invention provides an air-powered, or hydraulically-powered, rotary brush which is mounted on a hot stick for operation by a single electric company lineman to clean the outer peripheral surface of the aerial conductor in only two passes along the conductor. The device is drawn along the aerial conductor in one direction to effect cleaning of one-half of the peripheral surface of the conductor, and is then turned 180° and drawn along the conductor in the opposite direction to clean the other half of the peripheral surface.

BRIEF DESCRIPTION OF THE DRAWINGS

FIG. 1 is an elevational view showing a hot stick having at its forward end an air-powered motor, a rotary wire brush, and a hanger guide by which the device is supported in dependent position form the aerial conductor.

FIG. 2 is an enlarged view of the housing of the air-powered motor partly broken away showing a collar clamped to its forward end to which the hanger guide is secured.

FIG. 3 is a separate view showing the hanger guide, the collar, and the clamp.

FIG. 4 is a view showing the rotary brush supported by the hanger guide and in engagement with the left half of the peripheral surface of the cable.

FIG. 5 is a view similar to FIG. 4 but showing the hanger guide turned through 180° to allow the rotary brush to clean the other half of the peripheral surface of the cable.

DETAILED DESCRIPTION OF THE PREFERRED EMBODIMENT

Referring now to FIGS. 1 and 2 of the drawings, reference numeral 10 identifies the hot stick which, as is well known in the electric utility service art, is an insulating rod used by lineman as an elongated handle for various tools when they are working on "hot" high-voltage lines. Secured to the forward end of hotstick 10 is an air motor 20 contained within a housing 21. Housing 21 is provided at its rearward end with a bracket 22 having a saw tooth surface adapted to receive the saw tooth forward end 11 of hot stick 10. The forward end 11 is secured to the bracket 22 by bolt 12 secured as by a wing nut 13. An air hose 25 one end of which is adapted to be connected to a source of pressurized air, is strapped or taped to the hotstick 10 as by insulating tapes 26. The forward end of air hose 25 enters the housing 21 of the air motor 20. Any suitable form of drive motor may be used to drive the rotary brush. However, an air or hydraulic motor is preferable. Air motor 20 may be similar to that of a barrel-type air-powered impact tool commonly used in automobile service stations for loosening and removing, or tightening, wheel lug nuts.

Housing 21 of air motor 20 has a forwardly-projecting hollow cylindrical barrel 23 through which the output shaft 26 of the motor passes. Mounted on barrel 23 is a collar 35 which may be secured to the barrel as by a set-screw clamp 36. Secured to and extended forwardly from collar 35 is a hanger guide 30 comprised of a pair of J-hook legs 31,32, the outward ends of which are connected together by a transverse bar 33. The collar 35, clamp 36, and hanger guide 30 are, for clarity, shown alone in FIG. 3.

Extending forwardly from the air motor 20 is the drive shaft 26 which is coupled, as by a quick-change coupler 27 and a rotatable chuck 45, to shaft 46 of the rotary brush 40.

Brush 40 is a rotary brush of generally cylindrical configuration but having in its circumferential surface a U-shaped groove 41. Groove 41 is preferably of a shape and size adapted to receive the aerial conductor or cable which is to be cleaned. The bristles of the brush may be wire, or abrasive nylon, or any other suitable material.

In operation, the lineman hooks the hanger guide 30 over the aerial conductor C, with the hot stick 10 in a generally vertical position, such as is illustrated in FIG. 1. The hanger guide 30 holds the weight of the assembly. To clean the surface of the aerial conductor C, the lineman slides the assembly along the aerial conductor first in one direction and then in the other, but turning the hanger guide through 180° before making the return pass. When he slides the device in one direction, one half of the conductor is cleaned. He then removes the hanger guide 30 from the aerial conductor, turns it through 180°, and rehangs the hanger 30 on the conductor. When he then slides the device along the conductor in the opposite direction, the other half of the conductor is cleaned. This is illustrated in FIGS. 4 and 5. In FIG. 4, the left half of the peripheral surface of the cable C is being cleaned by the rotary brush 40, with the cable C being engaged within the circumferential groove 41 of the brush. In FIG. 5, the device has been turned through 180° and as the lineman slides the device along the cable in the opposite direction, the opposite or right half of the peripheral surface of the conductor C is cleaned by the rotary brush 40. Again the cable is within the circumferential groove 41.

While a wire rotary brush is preferred, it is not essential that the bristles by wire.

It is to be understood that hanger 30 is so shaped and prealigned that when it is hung over the aerial conductor, the cable is received within the circumferential groove 41 of the brush 40.

The device described and illustrated may be readily handled by a single lineman and is effective to quickly clean the conductor in a single back and forth operation.

In the illustrated embodiment, air hose 25 is shown to be a separate hose or tube which is strapped or taped, as by tapes 26, to hot stick 10. For more effective operation, a combined hot stick and air hose may be produced, as by molding, with an air tube or passageway molded along one side of the hot stick. In either case, a quick-connect connection may be provided, as at 27 in FIG. 1, and a push-bottom air control as at 28.

An air motor 20 and a compressed air supply 25 has been illustrated and described. However an hydraulic motor and hydraulic supply may be used in lieu of an air motor and pneumatic supply.

What is claimed is:

1. A device for cleaning aerial conductors such as are used for electric power and other purposes, said device comprising:
   a. a rotary brush having a circumferential groove;
   b. a power drive for driving said brush rotationally;
   c. means connecting said power drive to said rotary brush;
   d. a hanger guide having hook means at one end;
   e. means mounting said hanger guide on said power drive in such position relative to said rotary brush that when said hanger guide is hooked over said aerial conductor, said conductor is engaged by said brush within the circumferential groove thereof; and
   f. an insulated hot stick, one end of which is connected to the housing of said power drive.

2. Apparatus according to claim 1 wherein said power drive includes an air motor.

3. Apparatus according to claim 2 wherein said power drive includes an air hose connecting said air motor to a source of compressed air.

4. Apparatus according to claim 1 wherein said power drive includes an hydraulic motor.

5. Apparatus according to claim 1 wherein said circumferential groove is centrally located on the periphery of said brush.

6. Apparatus according to claim 5 wherein said rotary brush was wire bristles.

7. Apparatus according to claim 6 wherein a collar is provided which is connected to the housing of said power drive, and wherein said hanger guide is mounted on said collar.

8. Apparatus according to claim 5 wherein said rotary brush has abrasive nylon bristles.

9. Apparatus according to claim 1 wherein said hook means of said hanger guide comprises a pair of parallel J-hook legs connected at their outer ends by a transverse bar.

* * * * *